D. O'BRIEN.
Dumping-Car.
No. 8,021. Reissued Jan. 1, 1878.
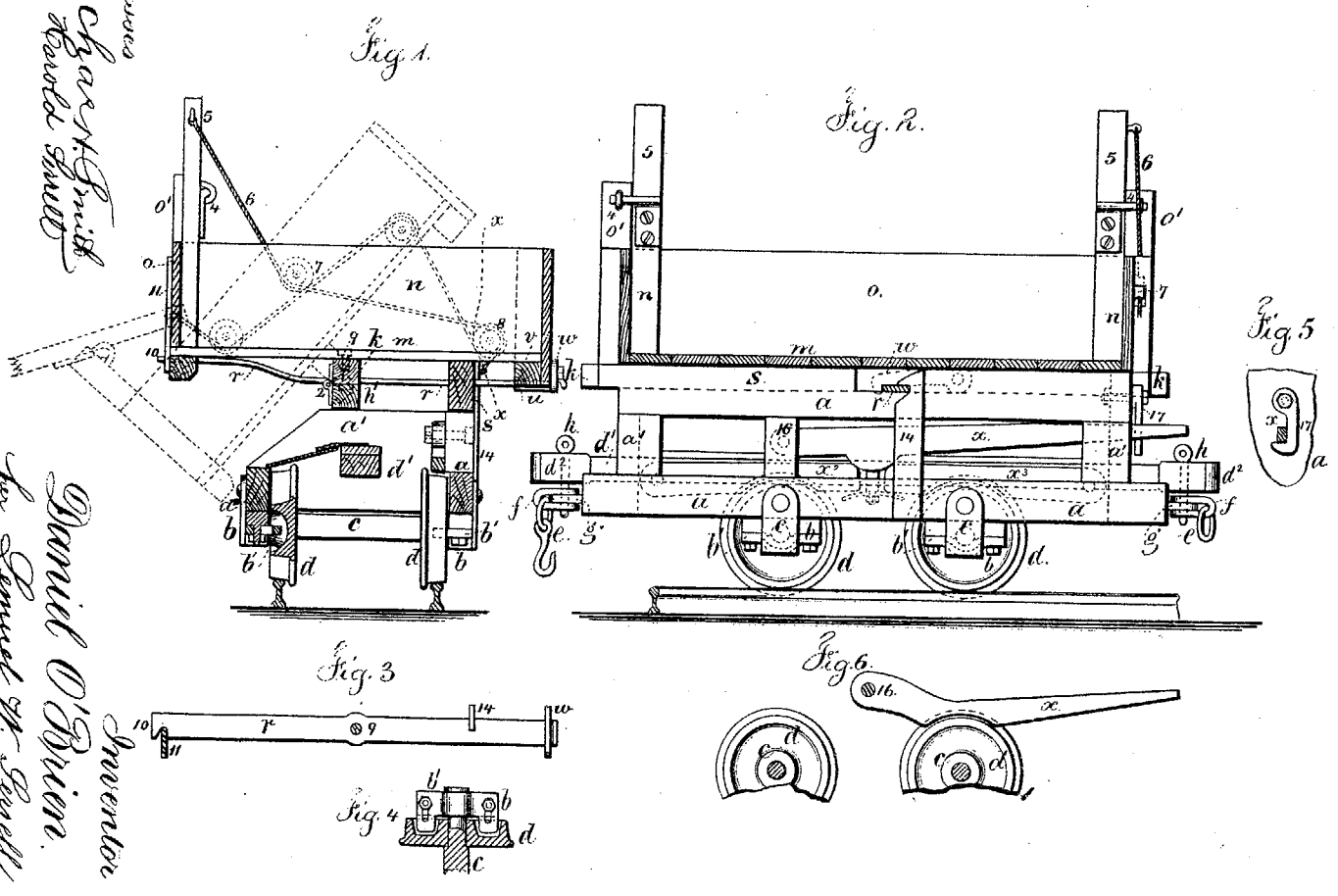
Witnesses
Chas. H. Smith
Harold Serrell
Inventor
Daniel O'Brien.
per Lemuel W. Serrell
Atty.

UNITED STATES PATENT OFFICE.

DANIEL O'BRIEN, OF BROOKLYN, NEW YORK.

IMPROVEMENT IN DUMPING-CARS.

Specification forming part of Letters Patent No. 184,048, dated November 7, 1876; Reissue No. 8,021, dated January 1, 1878; application filed June 18, 1877.

*To all whom it may concern:*

Be it known that I, DANIEL O'BRIEN, of Brooklyn, in the county of Kings and State of New York, have invented an Improvement in Dumping-Cars, of which the following is a specification:

The object of this invention is to simplify the construction of the dumping-cars used in conveying earth, gravel, &c., from one place to another, thereby avoiding the constant repairs, detention, and expenses consequent upon the use of the ordinary dumping-cars.

In the drawing, Figure 1 is a vertical section transversely of the car. Fig. 2 is a sectional elevation of the same at the line *x x*, and Fig. 3 is a plan view of the latch-lever detached.

The oblong frame *a* rests upon the journal boxes or bearings *b* of the axles *c*. *d d* are the car-wheels, of ordinary character. The lower parts *b'* of the boxes or bearings are attached by bolts passing through slots made transversely of the box, (see inverted plan, Fig. 4,) so that by slackening these bolts the box *b'* can be slipped laterally from beneath the journal sufficiently for the insertion of oil and cotton waste into the cavity provided in such box, after which the box is slipped back and held to its place. This avoids the risk of losing nuts and bolts which now exists. The draw-beam $d^1$ of the car runs through the end pieces of frame *a*, and its ends form the buffers of the cars. The ends of this beam are rounded, and protected by plates of metal, as at $d^2$.

The coupling-chains *e* and hooks are made to hang below the buffers, and there is a clevis, *f*, at the end of each chain, that passes above and below the stationary tongue *g*, and through these the coupling-pin *h* passes. By this construction the coupling-chain hangs below, and does not get between the buffers, and does not become injured, and the chains can be hooked together more or less after the cars have been run together, and the chains are free to draw with the clevis into any desired position. The cross end pieces *a'* of the frame *a* receive upon their upper surface the central bearing-beam *h'* and the side beam *s*, and these cross-pieces are beveled downwardly on the upper edge from the beam *h'* to the frame *a*, so as to allow the car to be dumped. The central sill *k* of the car-body rests upon the beam *h'*, and it is hinged thereto, as at 2. The frame composed of the parts *a a*, *a' a'*, *d'*, *h'*, and *s* is strengthened and the parts are attached by suitable bolts.

The car is of usual size and construction, except as hereinafter named. The bottom *m*, ends *n*, and swinging side *o* are constructed upon the ordinary plan, except that the pivots 4, upon which the side *o* swings, are at the corner-posts *o'* a considerable distance above the side-board, in order that the side-board may swing away from the body of the car and increase the width of the opening, through which the contents of the car, such as stones, roots, earth, &c., may be dumped. The side pieces 5 are extended up above the pivots. When the earth is being dumped from this car down an embankment, the side *o* will generally swing open sufficiently by its own weight for the delivery of the earth; but in order to open the same wider to clear the earth when dumped upon a level, I attach to the upper end of the side pieces 5 the chain or rope 6, passing around the pulleys 7 and 8, and attached to the frame *a*, so that when the car is dumped into the position shown by dotted lines, Fig. 1, the rope or chain 6 will have drawn the upper end of the side piece 5 inward and swung the side away from the pile of earth dumped from the car. The pivots 4 are upon the inner portion of the swinging side, so that the weight of the side will cause it to swing and shut tightly as soon as the car is righted.

In order to latch the swinging side *o* of the car, I make use of a lever, *r*, upon the under side of the car-box, pivoted at 9, and at one end there is a hook, 10, to catch the projecting metal plate 11 upon the swinging side *o*, so as to hold the same, and I make use of the same lever, *r*, to lock the car-box, so that it cannot tip. To effect this I make a notch in the bearing-sill *s* to give space for the lever *r*, and at one side of this notch I bolt a plate, 14, to the bearing-bar, the same having a hooked end, beneath which the locking-lever *r* passes when it is moved to lock the swinging side of the box, thereby securing the car-box from tipping, and holding the swinging side and car itself by one movement of the lever *r*.

This lever $r$ is guided by a plate, $u$, upon the under side of the car-sill $v$, and there is a swinging hook, $w$, at this side of the car, that serves to lock the lever $r$; and said hook may be arranged to hold the lever $r$ in either position to which it may be moved, and hold it when the car is full, or hold it out of the way while the car is being dumped or replaced.

I make use of a lever-brake, $x$, pivoted at 16, and moving in a slot at one end of the frame $a$, so that the brake can be applied by pressure from the foot.

There is a hanging hook, 17, (shown detached at Fig. 5,) that can be passed under the lever to hold it up out of the way, or over the lever to hold it and the brake down. By this construction the attendant is able to brake up one car after another with ease and rapidity.

In Fig. 6 the brake $x$ is shown as single, and in Fig. 2 it is represented as acting on the two brake-levers $x^2$ $x^3$, so as to apply the power to both the car-wheels. These brakes are not in the way of the car as it is tipped.

I do not claim hanging the swinging side of the car-box to the corner-posts, so that it will swing clear of the load as it is dumped; neither do I claim hanging the swinging side so that it will swing tightly to its place. In my car both these features are combined.

I claim as my invention—

1. The draw-beam $d'$, forming also the buffers, and the stationary tongue $g$, in combination with the coupling-pin $h$, clevis $f$, and chain $e$, substantially as set forth.

2. The box of the car, made with the swinging side $o$, pivots 4, and side pieces 5, in combination with the rope or chain 6 and pulleys, substantially as and for the purposes set forth.

3. The lever $r$, pivoted at 9, the hook 10, and catch-plate 11 on the swinging side $o$, in combination with the hooked plate 14, substantially as set forth.

4. The hook $w$, in combination with the lever $r$, hooks 10 and 11, car-box, and swinging side $o$, as and for the purposes set forth.

5. The brake-lever $x$, placed at the side of the frame $a$ opposite to that at which the box is dumped, and moving near its end in a slot in the frame $a$, in combination with the hook 17, for holding the brake-lever either up or down, as set forth.

6. The brake $x$ and brake-levers $x^2$ $x^3$, arranged as shown, so that the brake-levers $x^2$ $x^3$ are operated simultaneously by the brake $x$, and the parts are not in the way of the car as it is dumped, as set forth.

7. The end pieces $a'$ of the car-frame, beveled on the upper edge, and the central bearing-beam $h'$ and side beam $s$, sustained by the end pieces $a'$, in combination with the car-body, hinged to the beam $h'$, so as to be tipped sidewise, substantially as set forth.

8. The swinging side of the car-box, with end pieces extending above the side, and hinged to the corner-posts at their inner edges, so as to swing shut, and sufficiently above the side to cause the same to swing clear of the load as dumped, substantially as set forth.

Signed by me this 15th day of June, A. D. 1877.

DANIEL O'BRIEN.

Witnesses:
GEO. T. PINCKNEY,
HAROLD SERRELL.